United States Patent
Marukawa et al.

(10) Patent No.: US 6,834,035 B1
(45) Date of Patent: Dec. 21, 2004

(54) DIGITAL REPRODUCED SIGNAL PROCESSING DEVICE

(75) Inventors: Shoji Marukawa, Saijo (JP); Shinichiro Sato, Saijo (JP); Toshinori Okamoto, Saijo (JP); Yoshimasa Oda, Saijo (JP)

(73) Assignee: Matsushita Electric Industrial Co. Ltd. (JP)

( * ) Notice: Subject to any disclaimer, the term of this patent is extended or adjusted under 35 U.S.C. 154(b) by 465 days.

(21) Appl. No.: 09/857,162

(22) PCT Filed: Sep. 29, 2000

(86) PCT No.: PCT/JP00/06751
§ 371 (c)(1),
(2), (4) Date: Aug. 17, 2001

(87) PCT Pub. No.: WO01/26111
PCT Pub. Date: Apr. 12, 2001

(30) Foreign Application Priority Data

Oct. 1, 1999 (JP) ............................................ 11-281286

(51) Int. Cl.⁷ ................................................. G11B 5/76
(52) U.S. Cl. ................................................... 369/59.22
(58) Field of Search ......................... 369/47.35, 53.31, 369/59.22, 59.21, 59.23, 124.05, 53.34

(56) References Cited

U.S. PATENT DOCUMENTS 5,802,118 A * 9/1998 Bliss et al. .................. 375/350
5,872,666 A    2/1999 Saiki et al.
5,886,842 A    3/1999 Ziperovich

FOREIGN PATENT DOCUMENTS

| JP | 4-245711 | 9/1992 |
| JP | 10214461 A | 1/1997 |
| JP | HEI. 11-126433 | 5/1999 |

OTHER PUBLICATIONS

ISSCC94/Session 17/Disk–Drive Electronics/Paper FA 17.1.

* cited by examiner

Primary Examiner—Paul W. Huber
(74) Attorney, Agent, or Firm—Wall Marjama & Bilinski LLP (57) ABSTRACT

A digital reproduction signal processor relating to the present invention is provided with an analog/digital converter 4 for sampling an analog reproduction signal at a period which is longer than a digital recording channel rate, to convert to a low rate digital reproduction signal having a period which is longer than a recording channel rate, a coefficient setting unit 6 for performing a digital filtering with keeping the low rate, to generate a digital equalization signal, and an interpolator 7 for interpolating a reproduction data of the digital recording channel rate, and a half-rate Viterbi decoder 8 for taking out data.

According to the digital reproduction signal processor constructed as above, even when a digital read channel employing a PRML is employed, the analog/digital converter 4 or a digital circuit operated at a channel rate can be eliminated, thereby to provide a reproduction signal processor operating with low power consumption and of low cost.

3 Claims, 9 Drawing Sheets

DIGITAL REPRODUCED SIGNAL PROCESSING DEVICE

TECHNICAL FIELD

The present invention relates to a digital reproduction signal processor, and more particularly, to a digital reproduction signal processor which is employed in a reproduction apparatus for a digital recording medium such as an optical disc and a magnetic disk.

BACKGROUND ART

In recent years, in information recording media such as an optical disk and a magnetic disk, technological developments for aiming increases in the capacity and in the transfer speed have been prompted. Especially, improvements in basic performances of an information recording medium and a reading head for reading out information from the information recording medium are raised. In addition, improvements in reading accuracy and techniques such as higher multiple speed operation, which refers to the digital reproduction signal processor are raised.

The digital reproduction signal processor relates to a technique for taking out, from signals which are read from a recording medium by the reading head, an accurate recorded data, even from a signal in a bad state due to superposition of noises and inter-codes interferences, employing a high digital signal processing technique.

Further, in a field of a magnetic disk in-which researches in digital reproduction signal processors have been most advancing, an analog reproduction signal processing method called as "a peak detection" is mainly employed. This method is a technique, in which differentiation is analogously performed to a reproduction signal, thereby detecting a peak pattern of a signal and taking out a recorded data. The above-described technique provides effects that quite a simple circuit can be structured, and further, that it can realize a high speed apparatus that is operated with low power consumption.

However, according to a recent digital reproduction signal processor, most of reproduction signal processing methods for a magnetic disk have been shifted from the above-described analog detecting method called as "a peak detection" to a digital reproduction signal processing technique called as "PRML (Partial Response Maximum Likelihood) method".

This PRML method is a digital reproduction signal processing method which is obtained by combining a partial response method as a technique of a communication system and a maximum likelihood as a code theory. This PRML method shows superior characteristics in reproduction ability of high-density recorded signals, with relative to an analog reproduction signal processor. Therefore, in the field of the magnetic disk, most of the analog reproduction signal processors have been replaced by the PRML method.

Further, in recent years, digital reproduction signal processing such as the PRML method has been examined also in a field of an optical disk, similarly as in the magnetic disk.

A conventional digital reproduction signal processor will be hereinafter described.

Figure 13:
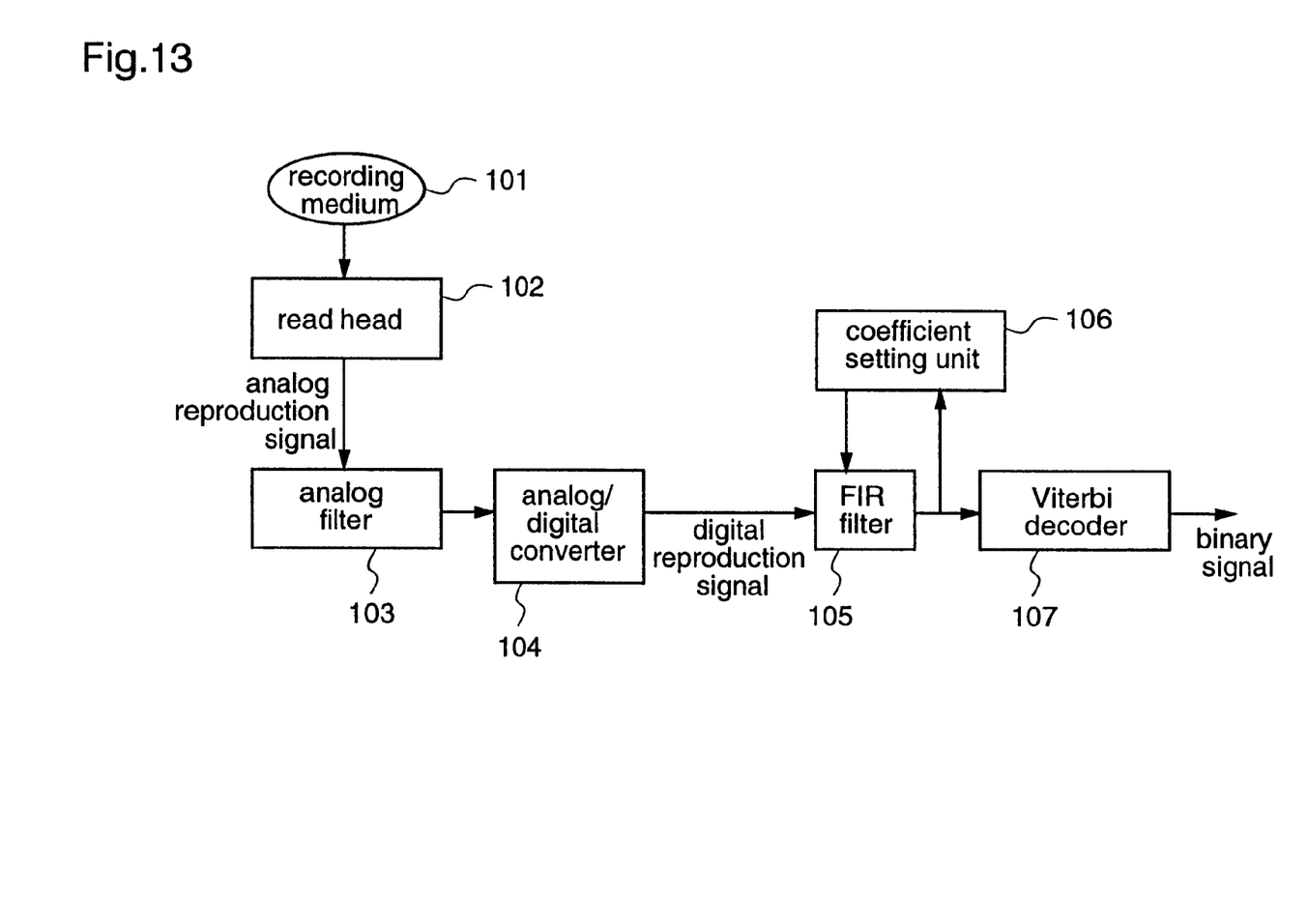
FIG. 13 is a block diagram illustrating a structure of a digital reproduction signal processor employing a conventional PRML method.

FIG. 13 is a block diagram illustrating a structure of a conventional digital reproduction signal processor employing a PRML method.

Initially, an analog signal read from a recording medium 101 by a reading head 102 is input to an analog filter 103. As for the analog reproduction signal input into the analog filter 103, high frequency noises thereof are cut off by the analog filter 103, and signal components of a specific band are emphasized. Next, the analog reproduction signal, which was filtered by the analog filter 103, is input into an analog/digital converter 104. The analog/digital converter 104 converts the analog reproduction signal to a digital reproduction signal at a timing, which is synchronized to a channel rate of the analog signal. The digital reproduction signal output from the analog/digital converter 104 is input into an FIR filter 105. The FIR filter is a digital filter for equalizing the digital reproduction signal.

Further, an output of the FIR filter 105 is input to a coefficient setting unit 106 and a Viterbi decoder 107. At this timing, in the coefficient setting unit 106, an optimized equivalent coefficient of the FIR filter is calculated from output data of the FIR filter 105 with employing an algorithm of Least Mean Square (hereinafter, referred to as LMS), thereby performing an equivalent coefficient setting. Further, the Viterbi decoder 107 performs the maximum likelihood according to output data stream output from the FIR filter 105, thereby to output a binary signal.

As described above, when the PRML method is employed, the reproduction signal processor can perform a reproduction without extremely intensifying high frequency noises. Further, even in a data pattern which is judged to be an error by a level judgement, the Viterbi decoder 107 can perform corrections, thereby reading more accurately a recorded reproduction signal.

However, the conventional digital reproduction signal processor has a problem in sharply increasing a circuit size and power consumption as compared with the conventional analog reproduction signal processor.

As described in the above-described prior art, according to the digital reproduction signal processor, most of the circuits are realized by digital circuits. Therefore, the digital reproduction signal processor requires an analog/digital converter which operates at a high speed and a digital circuit which operates at a high speed. More particularly, the analog/digital converter and the digital circuit are required to operate at a channel rate, which is a standard unit for writing digital data. The channel rate has the highest frequency among the drive systems. When the digital reproduction signal processor is operated at such a high frequency, the power consumption of the analog/digital converter is increased, and power consumption of logic circuits which are operated at high speeds are also increased in the same manner.

Further, in recent years, speed-up in a hard disk apparatus and an optical disk apparatus have been rapidly advanced. Especially, the reproduction speed of CD-ROM which is an optical disc oriented for only reading has been tremendously advancing from one multiple speed reproduction at the beginning of the development, to a forty multiple speed reproduction drive in recent days. Also, for a DVD-ROM, before it is fully diffused, a competition in realizing a higher multiple speed has already started.

However, when a higher multiple speed has progressed more and more, the channel rate will have a higher frequency, and when the frequency becomes higher, it results in a problem that realizing an efficient digital reproduction signal processing becomes difficult.

Initially, when the channel rate has become a high frequency, it is difficult to realize an analog/digital converter operating at a high speed. Even when it has become possible to operate an analog/digital converter at a high speed, the power consumption becomes extremely large. Also, for the digital circuit, as the channel rate becomes higher, it becomes more and more difficult to realize a high speed digital circuit. Further, even though the high speed digital circuit can be realized, the realization thereof might cause a problem that the cost as well as the power consumption should increase.

Further, as for the drives such as an HDD and a DVD-ROM, an increased power consumption cannot be accepted, even if a multiple speed performance is improved. Further, a digital signal processor installed in a note type personal computer is required to operate with a further lowered power consumption.

As described above, while the performance is progressed and the reading accuracy is improved in the conventional digital reproduction signal processor, it is difficult to realize speeding up of operation because of an increased power consumption.

The present invention is made to solve the above-described problems and it has for its object to provide a digital reproduction signal processor operating with low power consumption and of low cost by reducing an analog/digital converter or a digital circuit operating at a channel rate, even when a digital reading channel employing the PRML can be realized.

DISCLOSURE OF THE INVENTION

In order to realize the above-described objects, according to the present invention (claim 1), there is provided a digital reproduction signal processor which judges a digital recorded data from an analog reproduction signal which is read from a recording medium by a reading head, the digital reproduction signal processor, comprising: at least an analog/digital converter for sampling the analog digital reproduction signal at a period which is longer than the digital recording channel rate, and converting the same to a low rate digital reproduction signal having a period which is longer than that of the digital recording channel rate; an equalizing circuit for performing a digital filtering to the low rate digital reproduction signal with keeping the low rate, to generate a digital equalization signal; an interpolator for interpolating reproduction data with the digital recording channel rate from the digital equalization signal; a judging unit for the judging recorded data from the data stream interpolated by the interpolator.

According to the digital reproduction signal processor as constructed above, an analog/digital converter or digital circuits operated at a channel rate can be eliminated, thereby realizing an apparatus operating with low power consumption and of low cost.

According to the present invention (claim 2), there is provided a digital reproduction signal processor of claim 1, wherein the digital/analog converter performs a sampling at a half rate which is a half frequency of the recording channel rate.

According to the digital reproduction signal processor as constructed above, even employing a low frequency rate, it is possible to exhibit performances equivalent to those obtained by a channel rate processing.

According to the present invention (claim 3), there is provided a digital reproduction signal processor of claim 1, wherein the interpolator performs a Nyquist interpolation the band of which is limited to a half-rate Nyquist frequency.

According to the digital reproduction signal processor as constructed above, unwanted emphasis of high frequency components can be prevented, thereby providing improved interpolation characteristics.

According to the present invention (claim 4), there is provided a digital reproduction signal processor of claim 1, wherein the interpolation performs a partial response interpolation which corresponds to the partial response transmission characteristics.

According to the digital reproduction signal processor as constructed above, it is possible to obtain efficient interpolation characteristics having no unwanted noise emphasis.

According to the present invention (claim 5), there is provided a digital reproduction signal processor of claim 1, wherein the judging unit is constituted by a Viterbi decoder which can perform a half-rate operation.

According to the digital reproduction signal processor as constructed above, it is possible to simultaneously calculate existing probabilities of plural branches.

According to the present invention (claim 6), the digital reproduction signal processor of claim 1, wherein the judging unit performs an operation with one or more a code length constraint in modulation code.

According to the digital reproduction signal processor as constructed above, it is possible to reduce paths of the Viterbi decoder with employing the one or more of code length constraint in modulation code.

BRIEF DESCRIPTION OF THE DRAWINGS

FIG. 3 is a view illustrating a writing signal and a reproduction signal of a DVD according to the first embodiment of the present invention.

FIG. 4(a) is a view illustrating an analog reproduction signal and a sampling point of a channel rate according to a second embodiment of the present invention.

FIG. 4(b) is a view illustrating an analog reproduction signal and a sampling point of a half rate according to a second embodiment of the present invention.

BEST MODE FOR CARRYING OUT THE INVENTION

Hereinafter, embodiments will be described with reference to figures. The embodiments described hereinafter show an example, and the present invention is not limited to the embodiments.

Embodiment 1

Figure 1:
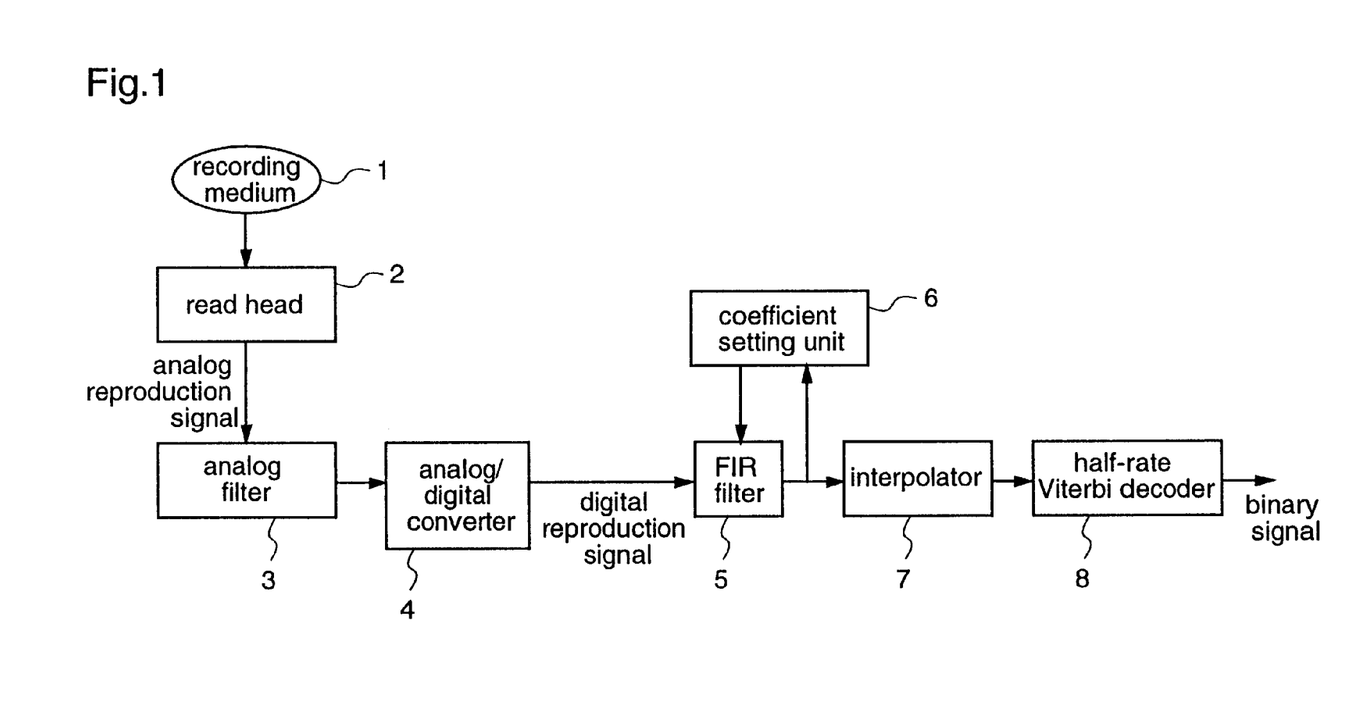
FIG. 1 is a block diagram illustrating a structure of a digital reproduction signal processor according to a first embodiment of the present invention.

FIG. 1 is a block diagram illustrating a structure of a digital reproduction signal processor according to a first embodiment of the present invention. In the present embodiment, a reproduction signal processor of a DVD-ROM which is a read-only optical disk will be described.

In FIG. 1, an analog reproduction signal which is read from a recording medium 1 by a reading head 2 is input into an analog filter 3. The analog reproduction signal input into the analog filter 3 is subjected to cutting of high frequency noises as well as signal components of a particular band thereof is emphasized. Next, the analog reproduction signal which was filtered by the analog filter 3 is input into an analog/digital converter 4. In the analog/digital converter 4, the analog reproduction signal is sampled at a half-rate, which is a half rate of a channel rate, to be converted to a half-rate digital reproduction signal. Subsequently, the digital reproduction signal output from the analog/digital converter 4 is input into an FIR filter 5. The FIR filter 5 is a digital filter for equalizing the digital reproduction signal.

Next, the output of the FIR filter 5 is input into a coefficient setting unit 6 and an interpolator 7. The coefficient setting unit 6 calculates an optimized equalization coefficient of the FIR filter 5 from the output data of the FIR filter 5 employing an LMS algorithm, thereby to set the equalization coefficient. The interpolator 7 performs a data interpolation of sampling points which are thinned out from the half-rate data stream. The output of the interpolator 7 is input into a half-rate Viterbi decoder 8. The half-rate Viterbi decoder 8 performs a maximum likelihood decoding for the data stream output from the interpolator 7, and outputs a binary signal.

Next, respective apparatus constituting the digital reproduction signal processor in FIG. 1 will be described in more detail.

Initially, an analog reproduction signal of a DVD-ROM will be described.

Figure 2:
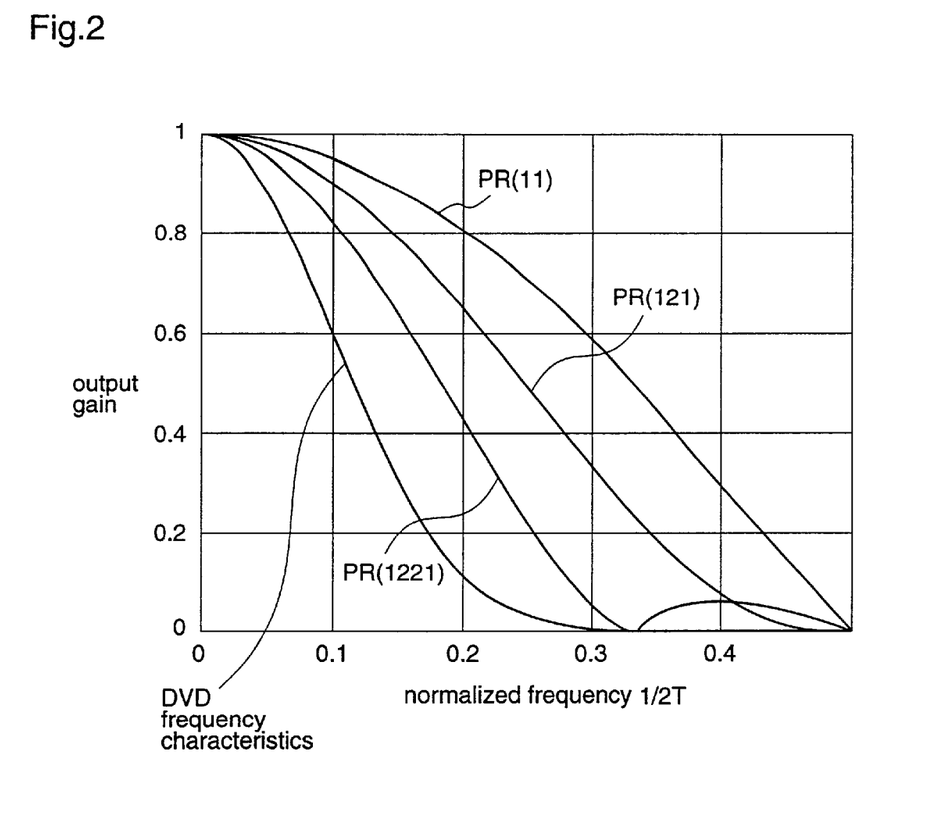
FIG. 2 is a view illustrating reproduction signal frequency characteristics of a DVD and frequency characteristics of a partial response which is examined to be employed in a DVD according to a first embodiment of the present invention.

FIG. 2 is a view illustrating reproduction signal frequency characteristics of a DVD and frequency characteristics of a partial response, which is under examination to be employed in a DVD, in an analog reproduction signal.

In FIG. 2, the ordinate presents output gain, the abscissas presents normalized frequency, and T shows a channel rate. A DVD employs a modulation code being an EFM (Eight to Fourteen Modulation) Plus. The shortest code length constraint in this modulation code is 2. Accordingly, the shortest inversion period is 3T. Therefore, the modulation code is characterized by less high frequency components of the code character itself. Further, as can be seen from FIG. 2, reproduction characteristics of the DVD have transmission characteristics such that high frequency components are attenuated, and the EFM Plus is selected as a code which is suitable for this reproduction characteristics. When a partial response (PR) is to be applied to a reproduction system, frequency characteristics of the partial response have to be conformed to reproduction signal characteristics of the DVD, as much as possible. In this case, the lower order partial response such as PR (1, 1) in the figure cannot be made close to the reproduction characteristics of the DVD. Therefore, a higher order partial response such as PR (1, 2, 2, 1) is required to be introduced.

Figure 3A:
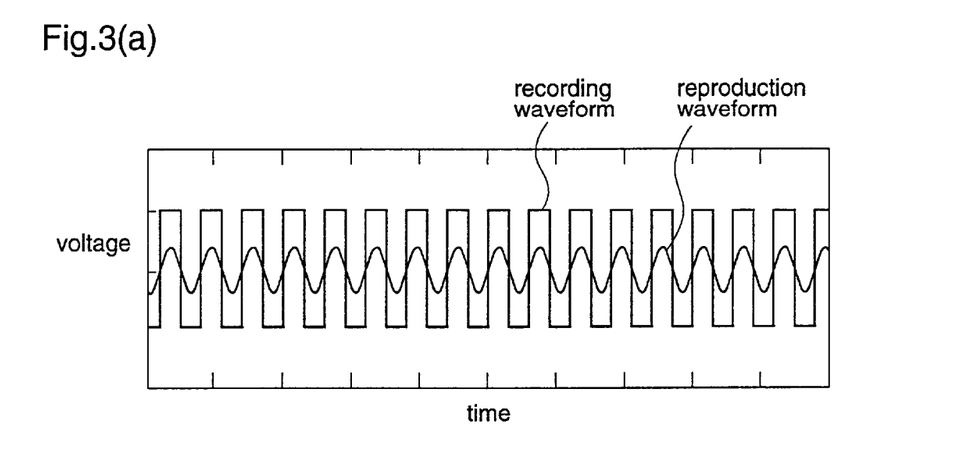
FIG. 3(a) is a view illustrating a writing signal and a reproduction signal of a 3T continuous signal according to the first embodiment of the present invention.
Figure 3B:
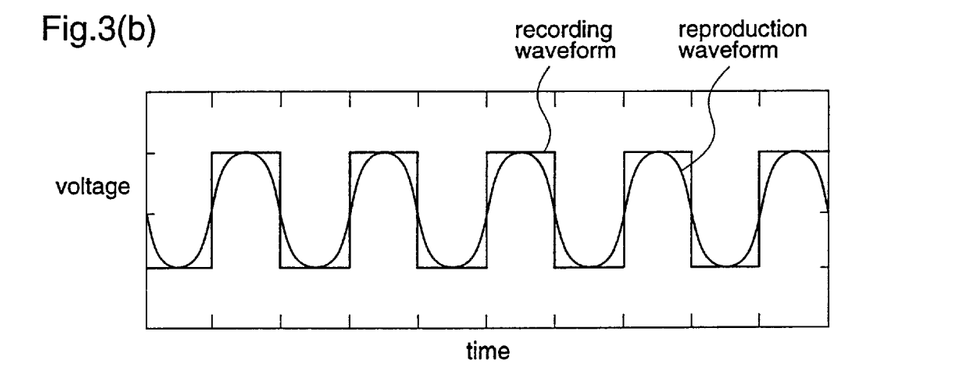
FIG. 3(b) is a view illustrating a writing signal and a reproduction signal of a 10T continuous signal according to the first embodiment of the present invention.

FIG. 3 is a view illustrating a writing signal and a reproduction signal of a DVD according to the analog reproduction signal. FIG. 3(a) is a view illustrating a writing signal and a reproduction signal of a 3T continuous signal. FIG. 3(b) is a view illustrating a writing signal and a reproduction signal of a 10T continuous signal.

In FIG. 3, the ordinates presents voltage, and the abscissas presents time. As can be seen from FIG. 3, the amplitude of the 3T continuous signal is damped to about one-third of the 10T continuous signal.

Next, the analog filter 3 performs suppressing of high frequency band noises and emphasis of the specified frequency. The analog filter 3 is employed as an anti-aliasing filter for emphasizing signals to some extent and suppressing folding noises generated in the analog/digital converter, in order to conform with the partial response frequency characteristics employed. An equi-ripple filter which has a flat group delay characteristics of the pass band is normally employed.

The analog/digital converter 4 is an apparatus for performing a sampling of the analog reproduction signal at a timing of a clock synchronized with the analog reproduction signal, thereby to convert the analog signal to a digital signal. Here, the analog/digital converter 4 performs the sampling at a half of the channel rate, particularly, at timings synchronized with the analog reproduction signal of the half rate.

Figure 5:
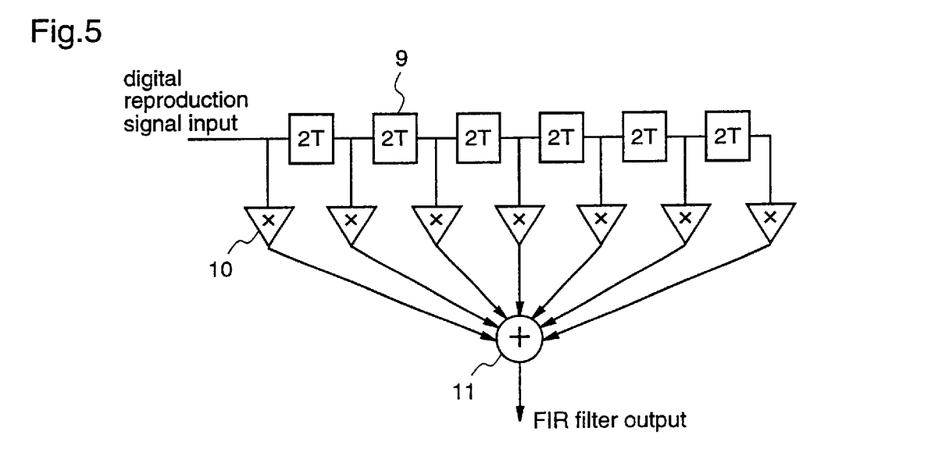
FIG. 5 is a view illustrating a structure of an FIR filter according to a third embodiment of the present invention.

An FIR filter 5 performs a filtering processing to the digital reproduction signal which was obtained with converted by the analog/digital converter 4 in accordance with an adaptive equalization coefficient which is determined by the coefficient setting unit 6. FIG. 5 illustrates a view showing a structure of the FIR filter 5.

In FIG. 5, the FIR filter 5 is constituted by a delay component 9, a multiplier 10, and an adder 11. The delay component 9 comprises a data flip-flop, and has a function for delaying a clock cycle when a clock is input. Further, the delay element 9 is operated as a 2T delay component since a clock of a half rate, particularly, a clock of a 2T rate is input.

A coefficient setting unit 6 is one for determining an adaptive equalization coefficient which is optimum for equalizing impulse characteristics of the digital reproduction signal, which was filtered by the FIR filter 5, to a form of a partial response, thereby providing an equalized digital reproduction signal.

The partial response employed in the present embodiment is PR (1, 2, 2, 1), and an equalization target to be equalized by the FIR filter 5 is an impulse response (1, 2, 2, 1).

In the coefficient setting unit 6, an adaptive equivalent coefficient is calculated by an LMS algorithm. The LMS is a feedback operation for minimizing square errors between a "desired response" and a "response by the transmission path". In the coefficient setting unit 6, the "desired response" is a provisional judgement value, and the "response by the transmission path" is the digital reproduction signal which is obtained by inputting a signal from the FIR filter 5, to be equalized to the partial response frequency characteristics.

A formula for setting a coefficient of LMS is described as follows:

$P(n(t+1))=P(nt)+(Ak \times E(nt) \times E(nt) \times X(nt))$ ($t=0, 1, 2, 3 \ldots$)

From the above formula, P(nt) shows a present coefficient, and P(n(t+1)) shows a renewed coefficient, Ak shows a tap gain, E(nt) shows an equalization error, and X(nt) shows an FIR input signal.

The interpolator 7 interpolates sample rates which are thinned out for the half-rate digital reproduction signal, thereby to generate a full-rate signal.

Figure 9:
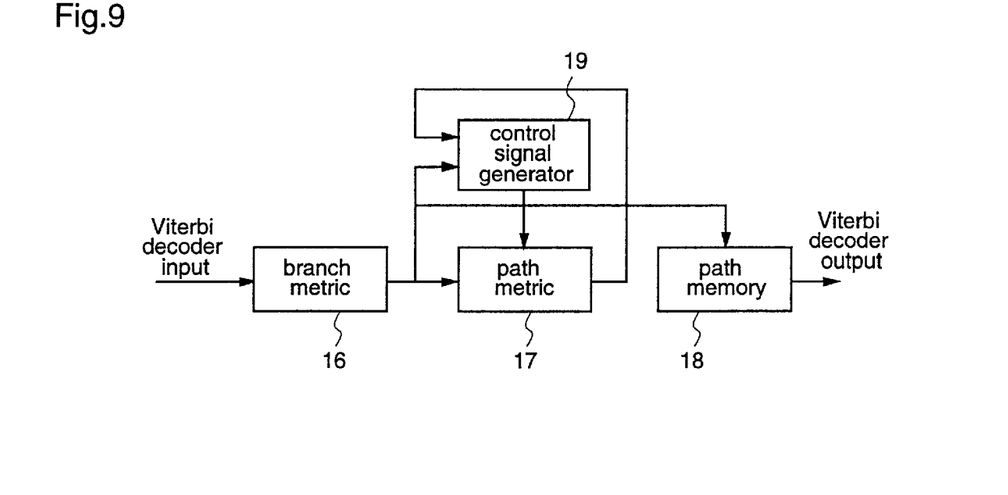
FIG. 9 is a view illustrating a structure of a half-rate Viterbi decoder according to the first embodiment of the present invention.

Next, the half-rate Viterbi decoder 8 is constituted by a branch metric 16, a path metric 17, a path memory 18, and a control signal generator 19 as illustrated in the construction diagram of FIG. 9.

As described above, the digital reproduction signal processor of this first embodiment is provided with an analog/digital converter for sampling an analog reproduction signal at a period which is longer than the digital recording channel rate, to convert the analog reproduction signal to a low-rate digital reproduction signal having a period longer than the recording channel rate and a judging unit for equalizing the digital reproduction signal with keeping the low-rate and performing interpolation thereto, thereby to take out data. Therefore, the analog/digital converter or the digital circuit operating at the channel rate are eliminated, thereby realizing an apparatus operating with low power consumption and of low cost.

Embodiment 2.

Figure 4:
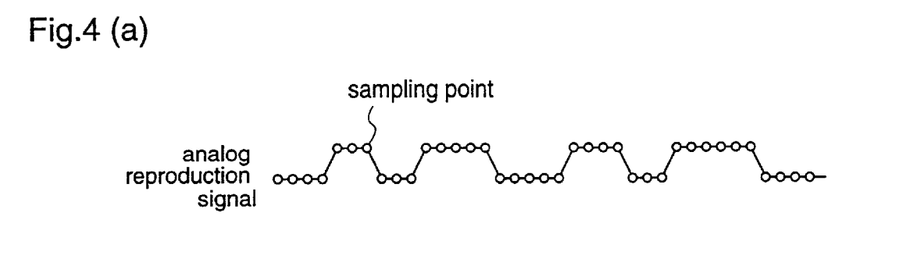
FIG. 4 is a view illustrating a sampling point of an analog/digital converter according to a second embodiment of the present invention.

FIG. 4 is a view illustrating sampling points of an analog/digital converter according to a second embodiment of the present invention. FIG. 4(a) is a view illustrating the analog reproduction signal and sampling points of the channel rate, and FIG. 4(b) is a view illustrating the analog reproduction signal and sampling points of a half rate.

In FIG. 4, when a channel rate sampling is performed, it is possible to reproduce signals in a frequency band up to a half channel rate from the sampled discrete data. However, as illustrated in FIG. 2, the reproduction characteristics of the DVD has a featured in which high frequency components are attenuated to a great extent. Accordingly, when the frequency characteristics of the DVD are noticed, since most of signal components exist in the frequency band of 1/4T, in order to realize a function of signal reproduction, it is not necessarily required to perform sampling at a channel rate of 1/T. More particularly, it is possible to realize a reproduction signal processing having a desired performances, even when performing sampling at a channel rate of below 1/T.

As described above, according to the digital reproduction signal processor of this second embodiment, the frequency for performing sampling in the analog/digital converter made a frequency employing a half clock of the recording channel rate, thereby realizing performances equivalent to those in the channel rate processing, even when employing a low rate frequency.

Embodiment 3.

Figure 6:
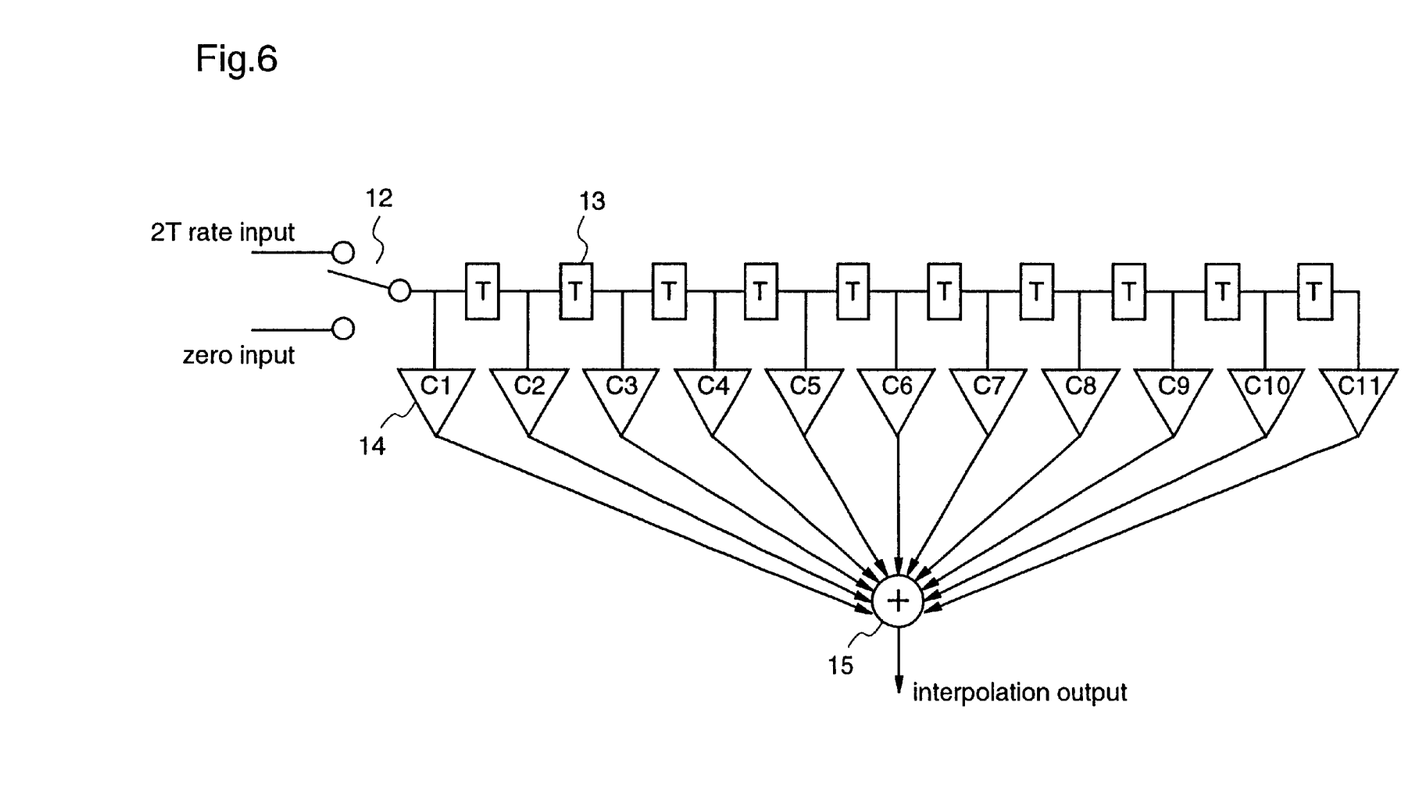
FIG. 6 is a view illustrating a structure of an interpolator constituting a digital reproduction signal processor.

FIG. 6 is a view illustrating a structure of an interpolator constituting a digital reproduction signal processor according to a third embodiment in the present invention. As an interpolator, an FIR-type interpolator is employed.

In FIG. 6, the interpolator 7 is composed of a zero stuffing sampler 12, a delay component 13, a multiplier 14, and an adder 15.

Initially, zero stuffing is performed to a signal which is input at 2T rate, to be converted to a data stream at 1T rate, which is input into an interpolating FIR filter of 1T rate. At this time, a half-rate Nyquist coefficient is set on condition that a signal exists in a frequency band of 1/(4×T) or less. A coefficient of the interpolating filter (Cn) can be obtained according to the following formula.

$Cn = \sin(Tn \times \pi/2)/(Tn \times \pi/2)$

According to the above formula, the filtering coefficient (Cn) at each point is as follows:

C1=0.127, C2=0, C3=−0.212, C4=0, C5=0.637, C6=1, C7=0.637, C8=0, C9=−0.212, C10=0, C11=0.127.

Figure 7:
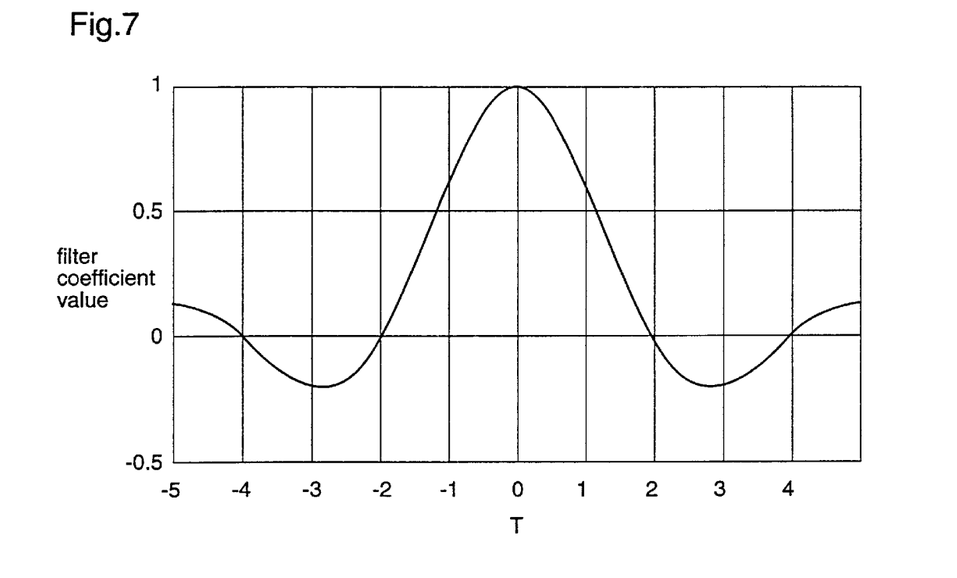
FIG. 7 is a view illustrating half-rate Nyquist response characteristics according to the third embodiment of the present invention.

FIG. 7 is a view illustrating half-rate Nyquist response characteristics according to the interpolator.

In FIG. 7, the abscissa presents filtering coefficients (Cn) at each point which are calculated according to the above formula, and an axis of abscissas shows values at each point in a T step. The above-described interpolation performed by setting half-rate Nyquist coefficients should be referred to as a half-rate Nyquist interpolation.

As described above, according to the digital reproduction signal processor of this third embodiment, as an interpolator constituting the digital reproduction signal processor, an interpolator for performing the half-rate Nyquist interpolation having limited the band to the half-rate Nyquist frequency is employed. Therefore, unwanted emphasis of high frequency components can be avoided, thereby to obtain sufficient interpolation characteristics.

Embodiment 4.

In the above-described third embodiment, an embodiment employing the half-rate Nyquist interpolation was described. In the present fourth embodiment, an example employing partial response interpolation will be described as an example of a structure of another interpolator.

The half-rate Nyquist interpolation is supposed to employ a frequency band up to one-fourth of sampling frequency. In contrast thereto, according to the partial response interpolation, all frequency bands under one-fourth of sampling frequency are not employed, and more particularly, interpolation is performed on condition that a band of high frequency components is limited according to partial response characteristics.

A structure of the partial response interpolator employs the FIR-type interpolator similarly as described in the third embodiment. Here, differences from the half-rate Nyquist interpolator reside in coefficient values of the FIR.

For example, in case where a PR(1, 2, 2, 1)-type partial response is employed, the partial response interpolation coefficients are shown as in the following formula:

$Cn = \{\pm \sin[(Tn-1.5) \times \pi]/[(Tn-1.5) \times \pi] + 2 \times \sin[(Tn-0.5) \times \pi]/[(Tn-0.5) \times \pi] + 2 \times \sin[(Tn+0.5) \times \pi]/[(Tn+0.5) \times \pi] + \sin[(Tn+1.5) \times \pi]/[(Tn+1.5) \times \pi]\}/Ka$ $Ka = \sin(-1.5 \times \pi)/(-1.5 \times \pi) + 2 \times \sin(-0.5 \times \pi)/(-0.5 \times \pi) + 2 \times \sin(0.5 \times \pi)/(0.5 \times \pi) + \sin(1.5 \times \pi)/(1.5 \times \pi)$.

According to the above formula, the filtering coefficients (Cn) at each point value are as follows:

C1=0, C2=−0,067, C3=0, C4=0.333, C5=0.789, C6=1, C7=0.789, C8=0.333, C9=0, C10=−0.067, C11=0.

Figure 8:
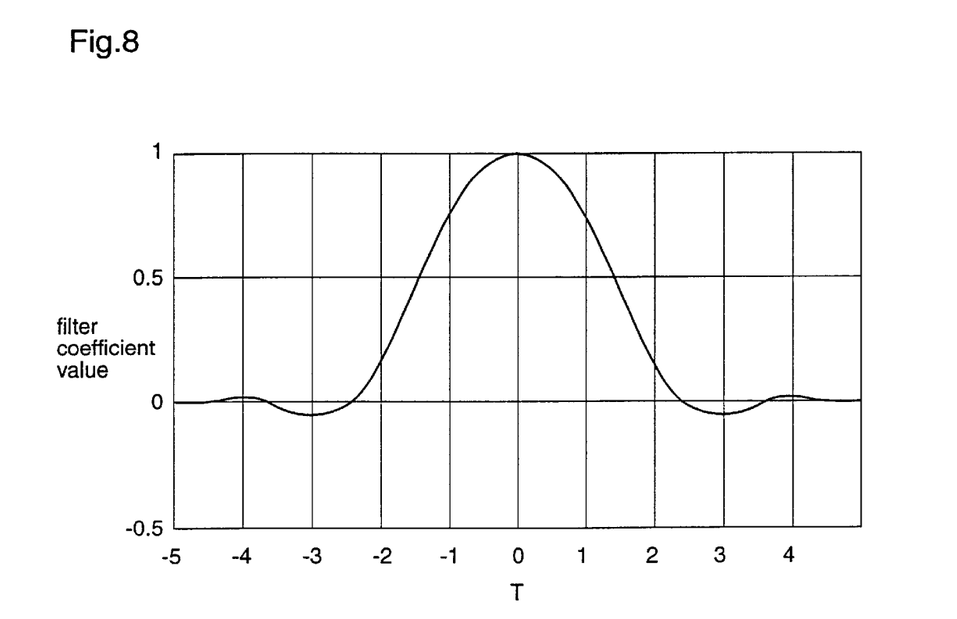
FIG. 8 is view illustrating response characteristics of a PR (1, 2, 2, 1) according to a partial response interpolator according to a fourth embodiment of the present invention.

FIG. 8 is view illustrating response characteristics of a PR (1, 2, 2, 1) according to a partial response interpolator of a fourth embodiment of the present invention. In the figure, the ordinate presents filtering coefficients (Cn) at each point value calculated according to the above formula, and an axis of abscissa shows each point value in a T step.

As described above, according to the digital reproduction signal processor according to the fourth embodiment, in an interpolator constituting the digital reproduction signal processor, partial response interpolation corresponding to the partial response transmission characteristics is performed. Therefore, it is possible to suppress emphasis of high frequency more than the half-rate Nyquist interpolation. Further, the partial response interpolation can be completely matched with the partial response characteristics of the transmission system, thereby providing sufficient interpolation characteristics having no unwanted noise emphasis.

Embodiment 5.

FIG. 9 is a view illustrating a structure of a PR(1, 2, 2, 1)-type half-rate Viterbi decoder according to the fifth embodiment of the present invention.

In FIG. 9, the half-rate Viterbi decoder is composed of a branch metric 16, a path metric 17, a path memory 18, and a control signal generator 19.

In the branch metric 16, combinations of all branches according to PR (1, 2, 2, 1), more particularly, existing probabilities of branches can be calculated. To calculate the existing probabilities of branches is completely identical to calculating-current differences from the Viterbi judging level, more particularly, to calculating Euclidean metric. The half-rate Viterbi decoder 8 calculates existing probabilities with making a set of two successive branches, so as to realize a half-rate operation. Further, the path-metric 17 performs accumulating calculations of existing probabilities of paths having possibilities to be employed, more particularly, accumulating calculations of each path of the Euclidean metric calculated in the branch metric 16. The calculations are performed until an output of the path metric 17 is established. The path memory 18 stores input data until data is established, and judged data is output from the path memory 18. The control signal generator 19 generates signals for controlling the path metric 17 and the path memory 18, and outputs the generated signals, thereby controlling the path metric 17 and the path memory 18.

As described above, in the digital reproduction signal processor according to the fifth embodiment, the judging unit is a unit constituted by a Viterbi decoding circuit which can perform half-rate operation. Therefore, it is possible to simultaneously calculate existing-probabilities of plural branch paths.

Embodiment 6.

Figure 10:
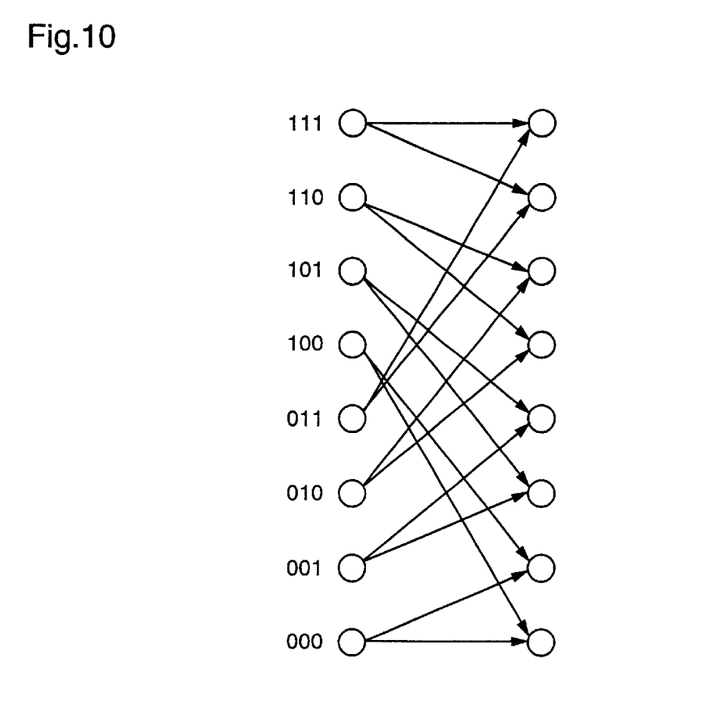
FIG. 10 is a trellis diagram of the PR (1, 2, 2, 1) in case where the code length constraint is 0, according to a sixth embodiment of the present invention.

FIG. 10 is a trellis diagram of the PR (1, 2, 2, 1) in case where a code length constraint is 0, according to a sixth embodiment of the present invention.

A PR (1, 2, 2, 1) has correlation with input data three-pieces before the current data. Therefore, when there is no code length constraint in a modulation code, more particularly, the code length constraint is 0, which results in a state of 8 bits, (000), (001), (010), (011), (100), (101), (110), (111). Therefore, the number of branches shown in FIG. 10 results in 16.

Figures 11, 12:
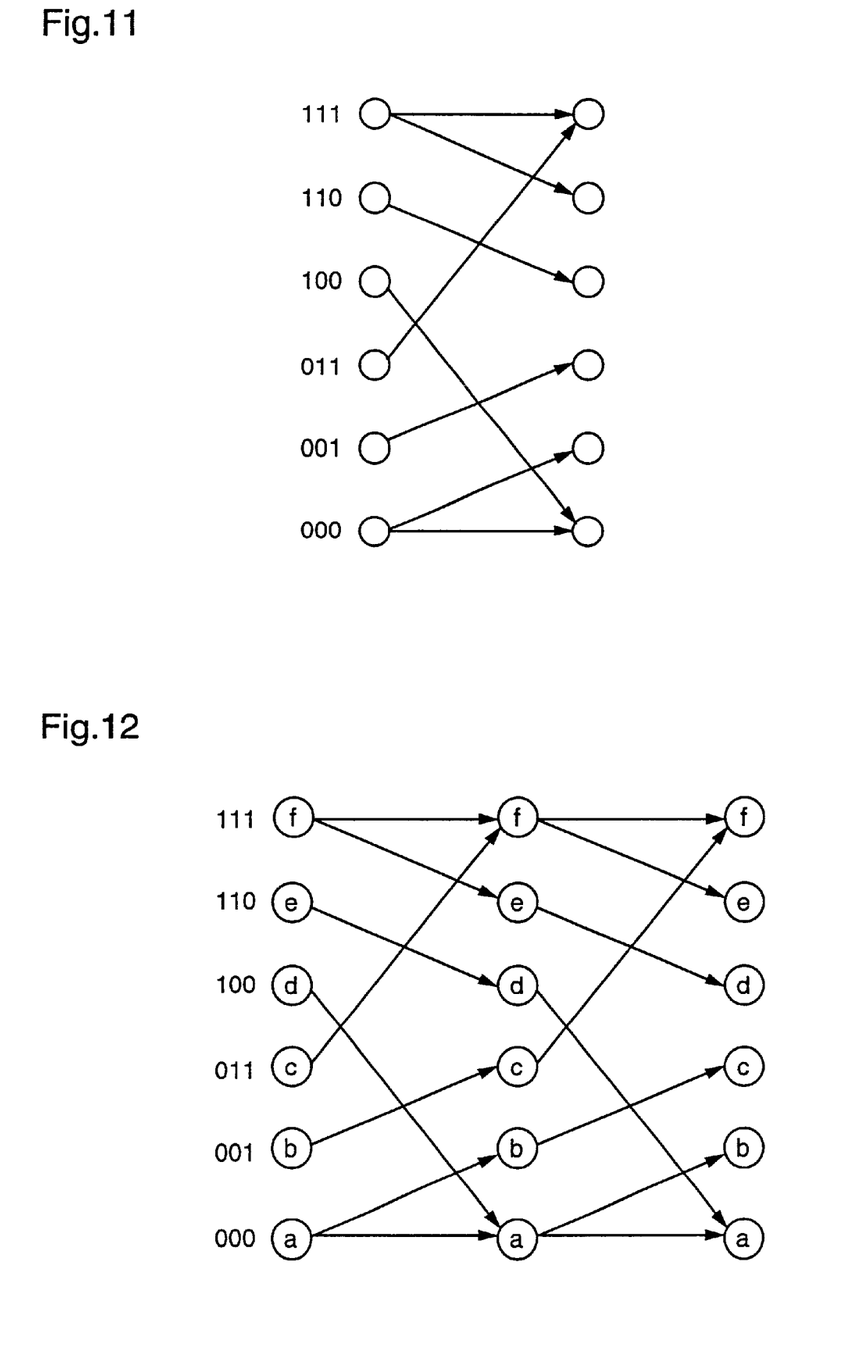
FIG. 11 is a trellis diagram of the PR (1, 2, 2, 1) in case where the code length constraint is 2, according to the sixth embodiment of the present invention.
FIG. 12 is a half-rate trellis diagram of the PR (1, 2, 2, 1) in case where the code length constraint is 2, according to the sixth embodiment of the present invention.

Further, FIG. 11 is a trellis diagram of the PR (1, 2, 2, 1) in case where the code length constraint is 2, according to the sixth embodiment of the present invention.

When the code length constraint is 2, the number of bits are reduced to 6 bits, (000), (001), (011), (100), (110), (111). Therefore, the number of branches results in 8.

The conventional full-rate Viterbi calculates such existing probabilities of branches at every 1T, and calculates existing probabilities of paths according to accumulating totals of existing probabilities of branches. However, the half-rate Viterbi decoder operates at 2T rate.

FIG. 12 is a half-rate trellis diagram of the PR (1, 2, 2, 1) in case where the code length constraint is 2, according to the same embodiment of the present invention.

Conventionally, existing probabilities of eight branches are calculated at every 1T. According to the half-rate process, probabilities of combinations of two branches are calculated. When the code-length constraint is 2 and PR (1, 2, 2, 1) is employed, the number of paths according to the half-rate Viterbi is twelve as shown in the followings:

(1)Sa>Sa>Sa
(2)Sa>Sa>Sb
(3)Sa>Sb>Sc
(4)Sb>Sc>Sf
(5)Sc>Sf>Se
(6)Sc>Sf>Sf
(7)Sd>Sa>Sb
(8)Sd>Sa>Sa
(9)Se>Sd>Sa
(10)Sf>Se>Sd
(11)Sf>Sf>Se
(12)Sf>Sf>Sf

As described above, the half-rate Viterbi decoder can be realized in a structure, wherein a probability operation of two branches is performed, and accumulating totals of probabilities of all branches are obtained in the path metric according to the result. Therefore, a Viterbi decoder for judging a data stream of 1T rate can be operated at half rate.

As described-above, in the digital reproduction signal processor according to the sixth embodiment, the code-length constraint of the modulation code is 1 or more. Therefore, it is possible to reduce the number of paths in the Viterbi decoder with employing the constraint.

INDUSTRIAL AVAILABILITY

As described above, according to the digital reproduction signal processor relating to the present invention, the analog/digital converter or a digital circuit operating at a channel rate can be eliminated even when a digital read channel employing the PRML is realized. Therefore, it is possible to provide the digital reproduction signal processor operating with low power consumption and of low cost. The digital reproduction signal processor is suitable especially for a digital reproduction signal processor in a recording medium such as a DVD-ROM, which operates at high multiple speed.

What is claimed is:

1. A digital reproduction signal processor which
judges a digital recorded data of which a code length constraint in modulation code is one or more from an analog reproduction signal which is read from a recording medium by a reading head, the digital reproduction signal processor comprising:
an analog/digital converter for sampling the analog reproduction signal at a half-rate which is a frequency of a half the digital recording channel rate, and converting the same to a low rate digital reproduction signal;
an equalizing circuit for performing a digital filtering to the low rate digital reproduction signal with keeping the low half-rate, to generate a digital equalization signal;
an interpolator for interpolating a digital reproduction signal which is extracted from the digital equalization signal by the half-rate sampling, and generating a digital reproduction signal at the digital recording channel rate from the interpolated digital reproduction signal and the digital equalization signal;
a Viterbi decoding circuit which operates at the half-rate and judges recorded data from a digital reproduction signal at the digital recording channel rate.

2. The digital reproduction signal processor of claim 1, wherein
the interpolator performs a Nyquist interpolation, the band of which is limited to a half-rate Nyquist frequency.

3. The digital reproduction signal processor of claim 1, wherein
the interpolator performs a partial response interpolation where a half-rate Nyquist frequency corresponds to the partial response transmission characteristics.

* * * * *

UNITED STATES PATENT AND TRADEMARK OFFICE
CERTIFICATE OF CORRECTION

PATENT NO. : 6,834,035 B1
DATED : December 21, 2004
INVENTOR(S) : Shoji Marukawa et al.

It is certified that error appears in the above-identified patent and that said Letters Patent is hereby corrected as shown below:

<u>Column 4,</u>
Lines 45-47, please delete.

Signed and Sealed this

Second Day of August, 2005

JON W. DUDAS
*Director of the United States Patent and Trademark Office*